United States Patent
Kamei et al.

(10) Patent No.: US 11,472,712 B2
(45) Date of Patent: Oct. 18, 2022

(54) METAL OXIDE PRODUCTION APPARATUS AND METAL OXIDE PRODUCTION METHOD

(71) Applicant: DIC Corporation, Tokyo (JP)

(72) Inventors: Kiyoo Kamei, Sakura (JP); Jian-Jun Yuan, Sakura (JP); Hitoshi Sekine, Sakura (JP); Hiroshi Kinoshita, Sakura (JP)

(73) Assignee: DIC Corporation, Tokyo (JP)

( * ) Notice: Subject to any disclaimer, the term of this patent is extended or adjusted under 35 U.S.C. 154(b) by 791 days.

(21) Appl. No.: 16/313,510

(22) PCT Filed: Jun. 13, 2017

(86) PCT No.: PCT/JP2017/021752
§ 371 (c)(1),
(2) Date: Dec. 27, 2018

(87) PCT Pub. No.: WO2018/003481
PCT Pub. Date: Jan. 4, 2018

(65) Prior Publication Data
US 2020/0180971 A1     Jun. 11, 2020

(30) Foreign Application Priority Data

Jun. 29, 2016    (JP) .............................. JP2016-128470

(51) Int. Cl.
    *C01F 7/02*      (2022.01)
    *C01B 13/18*     (2006.01)
(52) U.S. Cl.
    CPC .............. *C01F 7/02* (2013.01); *C01B 13/18* (2013.01); *C01P 2002/72* (2013.01); *C01P 2004/03* (2013.01)

(58) Field of Classification Search
    CPC .................................. C01F 7/02; C01B 13/18
    See application file for complete search history.

(56) References Cited

U.S. PATENT DOCUMENTS

| 6,197,218 B1 * | 3/2001 | Hampden-Smith ...... B01J 2/003 252/301.36 |
| 2003/0136020 A1 | 7/2003 | Miller et al. |
| 2011/0277680 A1 | 11/2011 | Teshima et al. |

FOREIGN PATENT DOCUMENTS

| CN | 202356104 U | 8/2012 |
| CN | 105152214 A | 12/2015 |

(Continued)

OTHER PUBLICATIONS

International Search Report dated Sep. 19, 2017, issued for PCT/JP2017/021752.

(Continued)

*Primary Examiner* — James A Fiorito
(74) *Attorney, Agent, or Firm* — Locke Lord LLP; James E. Armstrong, IV; Nicholas J. DiCeglie, Jr.

(57) ABSTRACT

Provided is a metal oxide production apparatus that implements a flux evaporation method. The production apparatus includes a firing furnace configured to subject a metal compound to firing in the presence of flux, a cooling pipe connected to the firing furnace and configured to convert vaporized flux resulting from the firing into powder, and a recovery means configured to recover powdered flux converted in the cooling pipe. Furthermore, provided is a metal oxide production method comprising a step (1) of subjecting a metal compound to firing in the presence of flux and obtaining a metal oxide and vaporized flux, a step (2) of converting the vaporized flux into powder by cooling the vaporized flux, and a step (3) of recovering powdered flux resulting from the converting.

10 Claims, 3 Drawing Sheets

(56) References Cited

FOREIGN PATENT DOCUMENTS

| | | |
|---|---|---|
| JP | 2005-515078 A | 5/2005 |
| JP | 2015-36347 A | 2/2015 |
| WO | 2005/054550 A1 | 6/2005 |

OTHER PUBLICATIONS

Notice of Reasons for Refusal (Second Office Action and Search Report) issued in Chinese Patent Application No. CN 201780037198.2, dated May 25, 2022.

* cited by examiner

FIG. 5

METAL OXIDE PRODUCTION APPARATUS AND METAL OXIDE PRODUCTION METHOD

TECHNICAL FIELD

The present invention relates to a metal oxide production apparatus and a metal oxide production method.

BACKGROUND ART

In recent years, research on synthesizing inorganic materials through learning from nature and living organisms has been actively conducted. In connection with this, the flux method is a method that was developed by utilizing knowledge of crystal (mineral) formation in the natural world and which involves causing crystals to precipitate out of a solution of an inorganic compound or a metal at an elevated temperature. Advantages of the flux method include the following: a target crystal can be grown at much lower temperatures than the melting temperature of the crystal; crystals with very few defects are grown; and a euhedral shape develops.

Known processes for producing a metal oxide by using the flux method are carried out as follows. A metal compound that is a precursor of the metal oxide is fired at an elevated temperature in the presence of a suitable oxide or salt serving as flux, and thereafter, (1) slow cooling is performed, which is known as the flux slow cooling method, or (2) the flux is evaporated, which is known as the flux evaporation method. Here, the flux slow cooling method promotes the crystal growth of the metal oxide by forming a supersaturated condition while performing slow cooling, whereas the flux evaporation method promotes the growth of a crystal of the metal oxide by utilizing the evaporation of flux as a driving force. The flux evaporation method has some advantages, an example of which is that, since flux flows out of the firing vessel as a result of evaporation, the method does not require burdensome work, for example, for removing the flux by washing as required in the flux slow cooling method.

The flux evaporation method is widely used in the production of metal oxides since the method does not require burdensome work. For example, PTL 1 describes an invention relating to a method for producing an artificial corundum crystal. In the method, an artificial corundum crystal having a hexagonal bipyramidal shape as its base shape is produced by using a flux evaporation method, in which a sample containing a raw material and flux is heated to precipitate and grow a crystal by utilizing the evaporation of flux as a driving force.

CITATION LIST

Patent Literature

PTL 1: International Publication No. 2005/054550

SUMMARY OF INVENTION

Technical Problem

Production of metal oxides by using the flux evaporation method, however, poses problems, such as high environmental impact and high production cost, because utilizing flux evaporation as a driving force results in release of the evaporated flux to the outside of the system or the environment.

Accordingly, an object of the present invention is to provide, for the flux evaporation method, a means for recovering evaporated flux.

Solution to Problem

The present inventors diligently performed studies to solve the problems described above. As a result, it was discovered that the problems described above can be solved by providing a cooling pipe for converting flux evaporated from the firing furnace into powder and a recovery means for recovering the powdered flux, and accordingly, the present invention was made.

That is, the present invention relates to a metal oxide production apparatus that implements the flux evaporation method. Here, the production apparatus includes a firing furnace, a cooling pipe, and a recovery means. The firing furnace is configured to subject a metal compound to firing in the presence of flux. The cooling pipe is connected to the firing furnace and configured to convert vaporized flux resulting from the firing into powder. The recovery means is configured to recover powdered flux converted in the cooling pipe.

Advantageous Effects of Invention

The present invention provides, for the flux evaporation method, a means for recovering evaporated flux.

DESCRIPTION OF EMBODIMENTS

<Metal Oxide Production Apparatus>

An embodiment of the present invention provides a metal oxide production apparatus that implements a flux method. Here, the production apparatus includes a firing furnace, a cooling pipe, and a recovery means. The firing furnace is configured to subject a metal compound to firing in the presence of flux. The cooling pipe is connected to the firing furnace and is configured to convert vaporized flux resulting from the firing into powder. The recovery means is configured to recover powdered flux converted in the cooling pipe.

The present embodiment will now be described with reference to the drawings; however, the technical scope of the present invention is to be defined by the recitation of the appended claims and is not limited to the embodiments described below. Note that the dimensional ratios in the drawings are exaggerated for convenience of description and may be different from the actual ratios.

Figure 1:
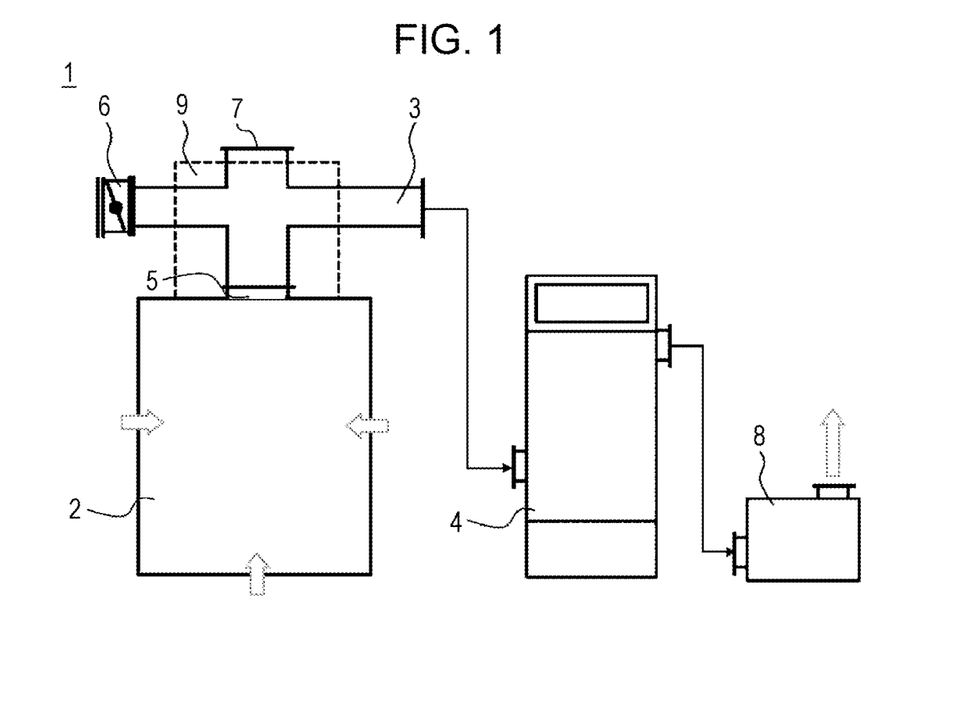
FIG. 1 is a schematic diagram of a metal oxide production apparatus according to an embodiment of the present invention.

FIG. 1 is a schematic diagram of a metal oxide production apparatus according to an embodiment of the present invention. A metal oxide production apparatus 1 includes a firing furnace 2, a cooling pipe 3, which has a cross shape, and a dust collector 4, which is a recovery means. The firing furnace 2 is configured to subject a metal compound to firing in the presence of flux. The cooling pipe 3 is connected to the firing furnace 2 and configured to convert vaporized flux resulting from the firing into powder. The dust collector 4 is configured to recover powdered flux converted in the cooling pipe 3. Here, the firing furnace 2 and the cooling pipe 3 are connected to each other with an outlet port 5 disposed therebetween. For the cooling pipe 3, an opening degree adjustment damper 6 is disposed at an outside air inlet port (not illustrated) at the left end portion, and an observation window 7 is disposed at the upper end portion. An exhaust device 8, which is a first blowing means, is connected to the dust collector 4. When the exhaust device 8 performs exhausting, suction is applied to the dust collector 4 and the cooling pipe 3, and therefore outside air is blown into the cooling pipe 3 through the opening degree adjustment damper 6 of the cooling pipe 3. That is, the exhaust device 8 performs the suction-applying function, and as a result, gas is passively caused to be blown in the cooling pipe 3. The metal oxide production apparatus 1 may include an external cooling device 9, which makes it possible to desirably control the conditions for cooling the vapor of flux generated in the firing furnace 2.

In the metal oxide production apparatus 1 of FIG. 1, flux evaporated from the firing furnace 2 can be converted into powder primarily in the cooling pipe 3 and can be recovered in the dust collector 4. The recovered flux can be recycled for production of a metal oxide. As a result, environmental impact can be reduced and the production cost can be reduced.

Next, each of the elements of the metal oxide production apparatus will be described in detail.

[Firing Furnace]

The firing furnace is a reaction vessel for producing a metal oxide by using the flux evaporation method.

Here, the flux evaporation method is a method of producing a metal oxide by firing a metal compound in the presence of flux. In the firing process, flux evaporates, and the crystal growth of the metal oxide progresses with the evaporation of flux acting as a driving force.

The firing furnace is not particularly limited provided that the firing furnace can be employed for the flux evaporation method and therefore may be a batch firing furnace or a continuous firing furnace.

Examples of the batch firing furnace include box-type firing furnaces, batch rotary kiln firing furnaces, tunnel-type firing furnaces, and tubular furnaces.

Examples of the continuous firing furnace include continuous rotary kiln firing furnaces, roller hearth kilns, pusher furnaces, conveyor furnaces, net conveyor furnaces, shaft kilns, and fluidized firing furnaces.

Of these, continuous firing furnaces are preferred because materials can be fed into the firing furnace continuously and mass production can be achieved. The firing furnace is more preferably a roller hearth kiln, a pusher furnace, a conveyor furnace, or a net conveyor furnace, and even more preferably a roller hearth kiln or a pusher furnace.

The heating method for the firing furnace is not particularly limited, and, for example, electricity, gas, microwave, or infrared may be used. Of these, electric heating methods are preferred because of ease of industrialization and ease of control.

The shape of the firing furnace is not particularly limited. Examples of the shape include prismatic shapes (e.g., triangular prisms, rectangular prisms, pentagonal prisms, hexagonal prisms, heptagonal prisms, and octagonal prisms), cylindrical shapes, pyramidal shapes (e.g., triangular pyramids, rectangular pyramids, pentagonal pyramids, hexagonal pyramids, heptagonal pyramids, and octagonal pyramids), and cones. Of these, prismatic shapes and cylindrical shapes are preferred.

(Outlet Port)

The firing furnace typically includes an outlet port. The outlet port has a function of discharging vaporized flux from the interior of the firing furnace.

The position of the outlet port is not particularly limited and may be any of the following: a side wall portion (lower side wall portion, middle side wall portion, upper side wall portion), a lower portion (bottom face portion if a bottom face is present), and an upper portion (upper face portion, if an upper face is present). Of these, an upper side wall portion and an upper portion (upper face portion) are preferred because vaporized flux can be efficiently discharged. An upper portion (upper face portion) is more preferable. The firing furnace may include two or more outlet ports. In the case that the firing furnace is a continuous firing furnace, each of the temperature zones may include a plurality of outlet ports.

(Gas Inlet Port)

The firing furnace may include a gas inlet port. In one embodiment, the firing furnace may preferably include a gas inlet port or more preferably include an outside air inlet port.

The gas inlet port is used to introduce gas into the firing furnace.

The gas is not particularly limited provided that the gas is not reactive with the vapor of flux. Examples of the gas include air (in this case, the gas inlet port is particularly also referred to as "outside air inlet port" in this specification), oxygen, nitrogen, argon, and water vapor. Of these, air is preferred as the gas from a cost standpoint.

The shape of the gas inlet port may be any of the following: a generally circular shape, a polygonal shape (e.g., triangular shape, rectangular shape, pentagonal shape, hexagonal shape, heptagonal shape, or octagonal shape); however, the shape may preferably be a generally circular shape or more preferably be a circular shape.

The position where the gas inlet port is to be disposed is not particularly limited. The gas inlet port may be disposed in any position in the firing furnace, but preferably, may be disposed in a face opposing the position where the outlet port is provided, because the vapor of flux can be efficiently discharged from the firing furnace.

(Opening Degree Adjustment Damper)

The opening degree adjustment damper may be typically provided at the gas inlet port and has a function of adjusting, for example, the amount and velocity of the gas to be introduced into the firing furnace.

The opening degree adjustment damper is not particularly limited and may be one known in the art. The opening degree adjustment damper may include a motor, may be provided with a backflow prevention mechanism, and may include a slit.

One opening degree adjustment damper may be included, or two or more opening degree adjustment dampers may be included, depending on the configuration of the firing furnace.

(Second Blowing Means)

The firing furnace may include a second blowing means. The second blowing means has a function of actively blowing gas into the firing furnace. This enables vaporized flux generated in the firing furnace to be suitably discharged out of the firing furnace. Specifically, when gas is actively blown into the firing furnace, the interior of the firing furnace becomes pressurized as compared with the case in which blowing is not performed. As a result, the gas (including vaporized flux) within the firing furnace can easily migrate to the cooling pipe, which will be described later. Consequently, vaporized flux can be recovered quickly and effectively. In addition, in the flux evaporation method, the evaporation of flux acts as a driving force for crystal growth, and therefore, facilitating the discharge of vaporized flux from the firing furnace enables the flux evaporation method to suitably proceed. As a result, the resulting metal oxide can be a metal oxide with a suitably grown crystal.

Thus, according to a preferred embodiment, the firing furnace includes at least one second blowing means. In the case that the second blowing means is included, a gas inlet port for introducing gas into the firing furnace is typically included. In addition, it is preferable that an opening degree adjustment damper be provided to adjust the amount of gas to be blown and the blowing rate.

The configuration of the second blowing means is not particularly limited provided that the blowing of gas into the firing furnace is ensured. Typically, the configuration may be a configuration for actively blowing gas into the firing furnace. Specifically, a method of blowing gas by using pressure from a compressed outside air source may be used.

The position where the second blowing means is to be disposed is not particularly limited and may be any of the following: a side wall portion (lower side wall portion, middle side wall portion, upper side wall portion), a bottom portion (bottom face portion if a bottom face is present), and an upper portion (upper face portion, if an upper face is present). Of these, a face opposing the position where the outlet port is provided is preferred because vaporized flux can be discharged effectively through the outlet port.

Two or more second blowing means may be provided in the firing furnace. In such a case, two or more second blowing means may be disposed in locations close to each other (e.g., in the same face) so that the blowing force can be enhanced or may be disposed in opposing faces so that the gases can collide with each other within the firing furnace and the elevated temperature within the firing furnace can be utilized to cause the gas to circulate in a vertically upward direction.

[Cooling Pipe]

The cooling pipe is a pipe for cooling vaporized flux generated in the firing furnace to convert the vaporized flux into powder.

The cooling means for the cooling pipe is not particularly limited, and, as will be described later, examples include cooling by blowing gas into the cooling pipe, cooling with a cooling mechanism of the cooling pipe, and cooling with an external cooling device. Of these, cooling by blowing gas into the cooling pipe is preferred because the cost is low, vaporized flux can be effectively converted into powder by being brought into contact with low-temperature gas, and the powdered flux can be transported efficiently to the recovery means, which will be described later. Cooling by blowing outside air into the cooling pipe is more preferable.

The cooling pipe is typically disposed between the firing furnace and the later-described recovery means, and the configuration of the cooling pipe is not particularly limited. According to one embodiment, the cooling pipe may include at least one selected from the group consisting of gas supply ports, opening degree adjustment dampers, cooling mechanisms, and observation windows.

The material of the cooling pipe is not particularly limited and may be a metal or an alloy known in the art.

It is preferable that a ceramic coating or a thermal-insulating sleeve be provided inside the cooling pipe, and it is more preferable, from the standpoint of cost and ease of replacement, that a thermal-insulating sleeve be provided. Providing a ceramic coating or a thermal-insulating sleep prevents reaction between vaporized flux and the cooling pipe.

(Outlet Port)

The cooling pipe typically includes an outlet port. The outlet port has a function of discharging vaporized flux-containing gas, which is introduced from the firing furnace, from the cooling pipe to the recovery means.

Although the position of the outlet port varies depending on the shape of the cooling pipe, the outlet port is preferably disposed in a position 30 to 150 degrees with respect to the direction in which the vaporized flux-containing gas, which is introduced from the firing furnace, is introduced and is more preferably disposed in a position 45 to 135 degrees with respect thereto. Disposition in such a direction with respect to the direction in which the gas from the firing furnace is introduced is preferred. The reason is that vaporized flux, included in the gas introduced from the firing furnace, is prevented from being discharged as it is, and therefore, time for cooling within the cooling pipe is ensured.

One outlet port may be included, or two or more outlet ports may be included.

(Gas Inlet Port)

The cooling pipe may include a gas inlet port. In one embodiment, the cooling pipe preferably includes a gas inlet port or more preferably includes an outside air inlet port.

The gas inlet port is used to introduce gas into the cooling pipe.

The gas that may be used and the shape of the gas inlet port are similar to those described above, and therefore descriptions thereof are omitted here.

The position where the gas inlet port is to be disposed is not particularly limited. The gas inlet port may be disposed in any position in the cooling pipe, but, from the standpoint of cooling efficiency and efficiency of transport to the later-described recovery means, may preferably be disposed in a direction opposing the direction of the face connected to the recovery means.

(Opening Degree Adjustment Damper)

The opening degree adjustment damper may be typically provided at the gas inlet port and has a function of adjusting, for example, the amount and velocity of the gas to be introduced into the cooling pipe.

The opening degree adjustment damper that may be used is similar to that described above, and therefore descriptions thereof are omitted here.

One opening degree adjustment damper may be included, or two or more opening degree adjustment dampers may be included, depending on the configuration of the cooling pipe.

(Cooling Mechanism)

The cooling mechanism may have a function (internal cooling mechanism) of cooling the cooling pipe.

The cooling mechanism is not particularly limited. Examples of the cooling mechanism include gas cooling mechanisms, phase-change cooling mechanisms, and liquid cooling mechanisms.

The gas cooling mechanism is not particularly limited and may be, for example, a mechanism configured such that a gas, such as air, inert gas, hydrogen gas, or sulfur hexafluoride ($SF_6$), is provided to fill an inner portion of a cooling device and the gas is cooled and circulated by a heat exchanger or the like.

The phase-change cooling mechanism is not particularly limited and may be, for example, a mechanism configured such that a coolant, such as water, ammonia, carbon dioxide ($CO_2$), propane, perfluorocarbon, or Freon, is reciprocated between a heat receiving section and a heat dissipating section to carry out cooling. Specific examples of the configuration include heat lanes and heat pipes.

The liquid cooling mechanism is not particularly limited and may be, for example, a mechanism configured to circulate an insulating oil or the like to carry out cooling.

The cooling mechanism may be provided to cool the entirety of the cooling pipe or may be provided in a portion of the cooling pipe. In one embodiment, it is preferable that the cooling mechanism be provided in a portion between the gas inlet port and the position at which vaporized flux-containing gas, which is discharged from the firing furnace, collides with the gas. Providing the cooling mechanism in such a portion is preferable because, in the case that vaporized flux is converted into powder by cooling by blowing of gas into the cooling pipe, gas can be cooled or the low temperature of gas can be maintained.

(Observation Window)

The observation window is used to monitor the internal state of the cooling pipe. Providing the observation window makes it possible to monitor, for example, the state of conversion of flux into powder and clogging by the powdered flux, within the cooling pipe.

The observation window may be provided in any position of the cooling pipe, but preferably, may be provided in a face opposing the portion connected to the firing furnace because the state of conversion of flux into powder can be sufficiently observed.

One observation window may be provided, or two or more observation windows may be provided.

(Configuration of Cooling Pipe)

The configuration of the cooling pipe is not particularly limited. For example, a cross shape may be employed, as illustrated in FIG. 1, mentioned above. A cross shape with a branch pipe or a T-shape, for example, may be employed.

Figure 2:
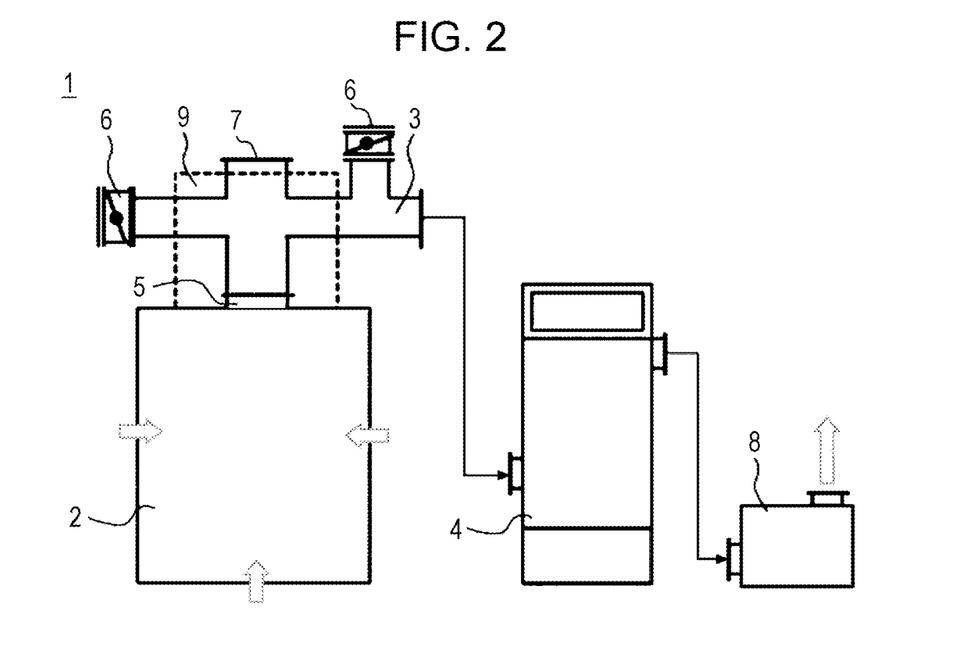
FIG. 2 is a schematic diagram of a metal oxide production apparatus according to another embodiment of the present invention.

FIG. 2 is a schematic diagram of a metal oxide production apparatus according to an embodiment of the present invention. In FIG. 2, a cross shape with a branch pipe is employed as the configuration of the cooling pipe, with the other configurations being the same as those of FIG. 1. In FIG. 2, the cooling pipe 3 is connected to the firing furnace 2 with the outlet port 5 disposed therebetween, and this is connected to the dust collector 4. The observation window 7 is disposed at the upper end portion of the cooling pipe 3. Furthermore, for the cooling pipe 3, the opening degree adjustment damper 6 is disposed at each of two outside air inlet ports (not illustrated), at the left end portion and at an upper right portion (branch pipe portion). When the cooling pipe 3 has such a configuration of a cross shape with a branch pipe, outside air is introduced through the opening degree adjustment damper 6 at the left end portion while outside air is also introduced through the opening degree adjustment damper 6 at the upper right portion (branch pipe portion). As a result, outside air is circulated randomly within the cooling pipe 3, which enables efficient cooling of vaporized flux. In addition, some of the powdered flux accumulated on corner portions within the cooling pipe 3, the portion connected to the outlet port 5, and the like can be transported to the dust collector 4.

Figure 3:
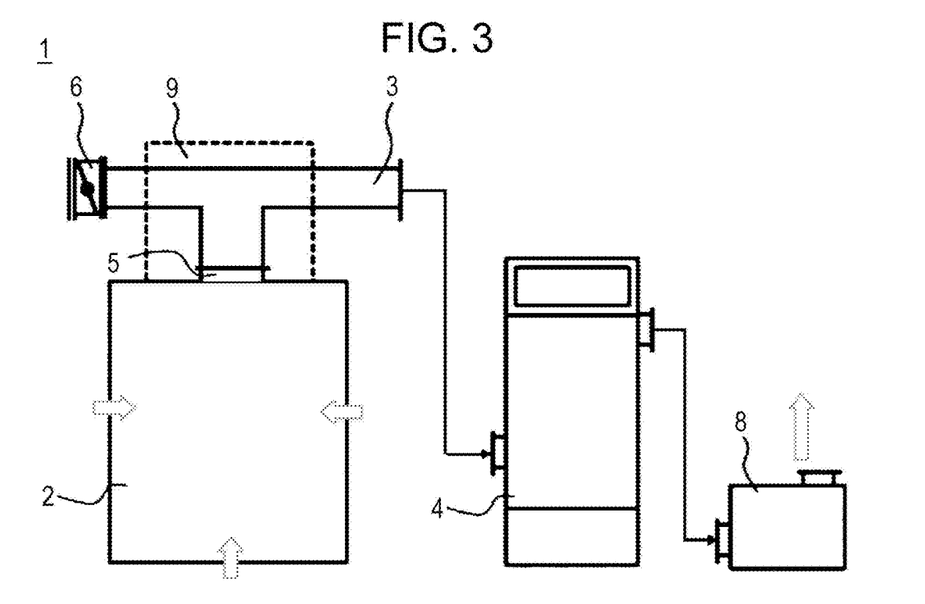
FIG. 3 is a schematic diagram of a metal oxide production apparatus according to another embodiment of the present invention.

FIG. 3 is a schematic diagram of a metal oxide production apparatus according to an embodiment of the present invention. In FIG. 3, a T-shape is employed as the configuration of the cooling pipe, with the other configurations being the same as those of FIG. 1. In FIG. 3, the cooling pipe 3 is connected to the firing furnace 2 with the outlet port 5 disposed therebetween, and this is connected to the dust collector 4. For the cooling pipe 3, the opening degree adjustment damper 6 is disposed at an outside air inlet port (not illustrated) at the left end portion. When the cooling pipe 3 has such a configuration of a T-shape, outside air introduced through the opening degree adjustment damper 6 at the left end portion can directly cool vaporized flux introduced from the firing furnace 2, and as a result, efficient conversion into powder can be achieved. In addition, introduced outside air travels linearly to carry out the transport to the dust collector 4, and therefore transition to the step of recovery can be accomplished in a short time. This makes it possible to recover finely powdered flux.

The configuration of the cooling pipe may be any of the following, in addition to a cross shape and a T shape: C-shape, L-shape, I-shape, V-shape, W-shape, E-shape, channel-shape, vortex shape, and the like. In addition, one or two or more branch pipes may be present at any positions of these cooling pipes. Of these, a cross shape, a T-shape, and an L-shape are preferred as the shape of the cooling pipe because powdered flux can be efficiently transported to the recovery means, such as a dust collector, without clogging the pipe. More preferably, the shape is a cross shape or a T-shape.

[Recovery Means]

The recovery means is used to recover powdered flux, which is transported from the cooling pipe.

The recovery means is not particularly limited. Examples of the recovery means include dust collectors, cyclones, and air filters. Of these, dust collectors are preferred as the recovery means.

The dust collector is not particularly limited. Examples of the dust collector include cyclone dust collectors, bag-filter dust collectors, inertial dust collectors, moving bed dust collectors, wet dust collectors, filter dust collectors, and electrostatic precipitators.

Of these, bag-filter dust collectors are preferred as the dust collector because powdered flux can be recovered efficiently and at low cost.

One recovery means may be used, or two or more recovery means may be used. In the case that two or more recovery means are used, the recovery means may be disposed in parallel, in series, or in combination thereof.

[First Blowing Means]

The production apparatus according to the present embodiment may include a first blowing means for blowing gas into the cooling pipe. Here, the first blowing means actively or passively blows gas into the cooling pipe. With this configuration, the gas within the cooling pipe can be discharged out of the cooling pipe without remaining in the interior, and as a result, effects of, for example, cooling the cooling pipe and enhancing the ability to transport powder that is within the cooling pipe to the recovery means, can be produced.

Accordingly, in a preferred embodiment, the metal oxide production apparatus includes a first blowing means.

In the case that the first blowing means is one that actively blows gas into the cooling pipe, a method of blowing gas by using pressure from a compressed outside air source may be used although there are no particular limitations on the configuration of the first blowing means. In the case that the first blowing means is configured to actively blow gas into the cooling pipe, the cooling pipe typically includes a gas inlet port for introducing gas into the cooling pipe. In addition, it is preferable that an opening degree adjustment damper be provided to adjust the amount of gas to be blown and the blowing rate.

In the case that the first blowing means is one that passively blows gas into the cooling pipe, the first blowing means is preferably a suction device although there are no particular limitations on the configuration of the first blowing means. When a suction device performs suctioning, gas can be passively caused to be blown in the cooling pipe. Examples of the suction device include exhaust devices (e.g., fan-type exhausters and blower-type exhausters), depressurizing pumps, and vacuum pumps. Of these, fan-type exhausters and blower-type exhausters are preferred because of the influence on the degree of depressurization within the firing furnace. Fan-type exhausters are more preferable. Note that, in this specification, a "suction device" refers to a device having a function of transferring gas that is within the cooling pipe out of the cooling pipe. For example, in the case that the first blowing means is an exhaust device, exhausting causes gas that is within the cooling pipe to be transported out of the cooling pipe. As a result, the interior of the cooling pipe is brought into a state of negative pressure (effect due to suction), which causes gas to be blown into the cooling pipe.

The position where the first blowing means is to be disposed is not particularly limited. The first blowing means may be directly connected to the cooling pipe or may be disposed at a location other than the cooling pipe. Of these, in the case that the first blowing means is one that actively blows gas into the cooling pipe, it is preferable that the first blowing means be directly connected to the cooling pipe, and it is preferable that the first blowing means be disposed on a level surface opposing the outlet port of the cooling pipe so that gas within the cooling pipe can be effectively transported to the recovery means. In the case that the first blowing means is one that passively blows gas into the cooling pipe, it is preferable that the first blowing means be connected to the recovery means. In such a case, the cooling pipe, the recovery means, and the first blowing means are arranged in the order stated. When the first blowing means is connected to the recovery means, the gas blowing effect produced by the first blowing means is exerted not only on the cooling pipe but also on the recovery means. Consequently, in the case that the recovery means is a dust collector, for example, powdered flux resulting from the gas blowing effect can be efficiently recovered.

[External Cooling Device]

The metal oxide production apparatus may include an external cooling device.

The external cooling device typically has a function of cooling the cooling pipe. The external cooling device is not particularly limited and may be one known in the art. Specifically, cooling with a constant-temperature water bath, cooling with a constant-temperature oil bath, or cooling with cold air from a blower, for example, may be used.

Furthermore, in one embodiment, an external cooling device may be disposed for the purpose of cooling a pipe and the like, which will be described below.

One external cooling device may be included, or two or more external cooling device may be included.

[Pipe]

The metal oxide production apparatus may include a pipe.

Connections between the firing furnace and the cooling pipe, between the cooling pipe and the recovery means, between the firing furnace and the second blowing means, between the second blowing means and the cooling pipe, between the first blowing means and the recovery means, and the like may be made by direct connection or with additional pipes.

The material of the cooling pipe is not particularly limited and may be a metal or an alloy known in the art.

It is preferable that a ceramic coating or a thermal-insulating sleep be provided inside a pipe that is to come into contact with vaporized flux and/or high-temperature powdered flux, and it is more preferable, from the standpoint of cost and ease of replacement, that a thermal-insulating sleeve be provided. Providing a ceramic coating or a thermal-insulating sleep prevents reaction between vaporized flux and the pipe.

<Metal Oxide Production Method>

An embodiment of the present invention provides a metal oxide production method. The metal oxide production method includes a step (1), a step (2), and a step (3). In the step (1), a metal compound is subjected to firing in the presence of flux to obtain a metal oxide and vaporized flux. In the step (2), the vaporized flux is converted into powder by being cooled. In the step (3), powdered flux resulting from the conversion is recovered. Optionally, a step (4), in which the flux recovered in the step (3) is reused, may be further included.

[Step (1)]

The step (1) is a step in which a metal compound is subjected to firing in the presence of flux to obtain a metal oxide and vaporized flux.

(Flux)

The flux is not particularly limited. Examples of the flux include molybdenum compounds, tungsten compounds, vanadium compounds, chlorine compounds, fluorine compounds, boron compounds, sulfate salts, nitrate salts, and carbonate salts.

The molybdenum compound is not particularly limited. Examples of the molybdenum compound include, elemental molybdenum, molybdenum trioxide, molybdenum dioxide, molybdenum sulfide, ammonium molybdate, $H_3PMo_{12}O_{40}$, $H_3SiMo_{12}O_{40}$, $K_2Mo_nO_{3n+1}$ (n=1 to 3), $Na_2Mo_nO_{3n+1}$ (n=1 to 3), $Li_2Mo_nO_{3n+1}$ (n=1 to 3), $MgMo_nO_{3n+1}$ (n=1 to 3), aluminum molybdate, silicon molybdate, magnesium molybdate, sodium molybdate, titanium molybdate, iron molybdate, potassium molybdate, zinc molybdate, boron molybdate, lithium molybdate, cobalt molybdate, nickel molybdate, manganese molybdate, chromium molybdate, cesium molybdate, barium molybdate, strontium molybdate, yttrium molybdate, zirconium molybdate, and copper molybdate.

The tungsten compound is not particularly limited. Examples of the tungsten compound include tungsten trioxide, tungsten sulfide, tungsten acids, tungsten chloride, calcium tungstate, potassium tungstate, lithium tungstate, aluminum tungstate, sodium tungstate, ammonium paratungstate, ammonium metatungstate, phosphotungstic acids, and silicotungstic acids.

The vanadium compound is not particularly limited. Examples of the vanadium compound include vanadium oxide, ammonium metavanadate, potassium vanadate, sodium metavanadate, sodium vanadate, vanadium oxychloride, vanadium oxysulfate, and vanadium chloride.

The chlorine compound is not particularly limited. Examples of the chlorine compound include potassium chloride, sodium chloride, lithium chloride, magnesium chloride, barium chloride, and ammonium chloride.

The fluorine compound is not particularly limited. Examples of the fluorine compound include aluminum fluoride, sodium fluoride, magnesium fluoride, calcium fluoride, cryolite, and lead fluoride.

The boron compound is not particularly limited. Examples of the boron compound include boric acids, boron oxide, sodium borate, and boron fluoride.

The sulfate salt is not particularly limited. Examples of the sulfate salt include sodium sulfate, potassium sulfate, calcium sulfate, and lithium sulfate.

The nitrate salt is not particularly limited. Examples of the nitrate salt include sodium nitrate, potassium nitrate, calcium nitrate, and lithium nitrate.

The carbonate salt is not particularly limited. Examples of the carbonate salt include sodium carbonate, potassium carbonate, calcium carbonate, and lithium carbonate.

One of these fluxes may be used alone, or two or more of these fluxes may be used in combination.

Of these, inclusion of a molybdenum compound is preferred because the resulting metal oxide has a single crystal structure and/or shape control is easy, and inclusion of molybdenum trioxide is more preferable because, for conversion of vaporized flux into powder, recovery can be efficiently carried out.

The amount of flux to be used is not particularly limited and may be appropriately selected in accordance with the desired metal oxide. For example, in the case that a metal oxide having a large particle diameter (not less than 1 mm) is to be produced, it is preferable that the molar ratio of the flux metal included in the flux to the metal element included in the metal compound (flux metal/metal element), which will be described later, be greater than 3.0. On the other hand, in the case that a metal oxide having a small particle diameter (less than 1 mm) is to be produced, the molar ratio of the flux metal included in the flux to the metal element included in the metal compound (flux metal/metal element), which will be described later, is preferably 0.001 to 3.0, more preferably 0.03 to 3.0, and even more preferably 0.08 to 0.7.

(Metal Compound)

The metal compound is not particularly limited. Examples of the metal compound include aluminum compounds, silicon compounds, titanium compounds, magnesium compounds, sodium compounds, potassium compounds, zirconium compounds, yttrium compounds, zinc compounds, copper compounds, and iron compounds. Of these, an aluminum compound, a silicon compound, a titanium compound, or a magnesium compound is preferably used.

Examples of the aluminum compound include aluminum chloride, aluminum sulfate, basic aluminum acetate, aluminum hydroxide, boehmite, pseudoboehmite, transition aluminum oxide (e.g., γ-aluminum oxide, δ-aluminum oxide, θ-aluminum oxide), α-aluminum oxide, and mixed aluminum oxide, which includes two or more crystal phases.

Examples of the silicon compound include crystalline silica, silica gel, silica nanoparticles, artificially synthesized amorphous silica, such as mesoporous silica, silicon-containing organic silicon compounds, and biosilica.

The titanium compound is not particularly limited. Examples of the titanium compound include titanium chloride, titanium sulfate, metatitanic acids, amorphous titanium oxide, anatase-type titanium oxide, rutile-type titanium oxide, and anatase-rutile-mixed-type titanium oxide.

The magnesium compound is not particularly limited. Examples of the magnesium compound include magnesium oxide, magnesium hydroxide, magnesium acetate tetrahydrate, magnesium carbonate, magnesium sulfate, magnesium chloride, magnesium nitride, magnesium hydride, magnesium fluoride, magnesium iodide, magnesium bromide, magnesium acrylate, magnesium dimethacrylate, magnesium ethoxide, magnesium gluconate, magnesium naphthenate, magnesium salicylate tetrahydrate, magnesium stearate, magnesium molybdate, magnesium lactate trihydrate, potassium magnesium chloride, magnesium nitrate hexahydrate, magnesium bromide hexahydrate, magnesium chloride hexahydrate, magnesium sulfate heptahydrate, magnesium oxalate dihydrate, magnesium benzoate tetrahydrate, magnesium citrate n-hydrate, trimagnesium dicitrate nonahydrate, and magnesium monoperoxyphthalate.

One of these metal compounds may be used alone, or two or more of these metal compounds may be used in combination.

In the case that two or more metal compounds are used in combination, a composite oxide can be produced. For example, in the case that an aluminum compound and a magnesium compound are used in combination, a spinel composite oxide having a basic composition of $MgAl_2O_4$ can be produced.

Of these, an aluminum compound is preferably used or an aluminum compound and a magnesium compound are preferably used.

(Firing)

By firing a metal compound at an elevated temperature in the presence of flux and vaporizing the flux, a metal oxide can be produced (flux evaporation method).

Typically, in the flux evaporation method, flux and a metal compound first react with each other to form an intermediate product. Next, by decomposing the intermediate product and causing the crystal to grow, a metal oxide can be produced. During that time, the evaporation of flux acts as a driving force to promote the crystal growth of the metal oxide.

For example, in the case that a molybdenum compound is used as the flux, a metal salt of a molybdic acid forms as an intermediate product, and this decomposes to produce a metal oxide. During that time, molybdenum trioxide vaporizes and evaporates, which acts as a driving force to promote the crystal growth of the metal oxide.

The state in which the flux and the metal compound are mixed with each other is not particularly limited, and it is sufficient that the flux and the metal compound be present in the same space. For example, even in the state in which the two are not mixed with each other, the flux reaction can proceed. In the case that the two are to be mixed with each other, it is possible to perform, for example, simple mixing in which the powders are mixed together, mechanical mixing using a mill or the like, or mixing using a mortar or the like. Here, the resulting mixture may be in a dry state or in a wet state. In the case that the two are not in a state of being mixed with each other, the firing temperature may be set to a temperature greater than or equal to the sublimation temperature of the flux to allow vaporized flux to come into contact with the metal oxide, and as a result, the gas solid reaction can be carried out.

The firing temperature depends on, for example, the flux and the metal compound that are used and the desired metal oxide, but typically, temperatures at which the intermediate product can decompose are preferable. For example, in the case that a molybdenum compound is used as the flux and an aluminum compound is used as the metal compound, aluminum molybdate can form as an intermediate product, and therefore, the firing temperature is preferably 500 to 900° C., more preferably 600 to 900° C., and even more preferably 700 to 900° C.

The rate of temperature increase depends on, for example, the flux and the metal compound that are used and the desired metal oxide but, from the standpoint of production efficiency, is preferably 0.5 to 100° C./min, more preferably 1 to 50° C./min, and even more preferably 2 to 10° C./min.

The internal pressure within the firing furnace is not particularly limited and may be a positive pressure or a negative pressure; however, to discharge flux suitably from the firing furnace to the cooling pipe, it is preferable that the firing be performed under reduced pressure. Specifically, the degree of pressure reduction is preferably −5000 to −10 Pa, more preferably −2000 to −20 Pa, and even more preferably −1000 to −50 Pa. A degree of pressure reduction of −5000 Pa or greater is preferable because high sealing performance and mechanical strength are not excessively required of the firing furnace and therefore the production cost can be reduced. On the other hand, a degree of pressure reduction of −10 Pa or less is preferable because clogging of the outlet port of the firing furnace by flux can be prevented.

The reaction time is also not particularly limited and may range, for example, from 1 minute to 30 hours.

In the case that gas is blown into the firing furnace during firing, the temperature of the gas to be blown is preferably 5 to 500° C. and more preferably 10 to 100° C.

Furthermore, the gas blowing rate is preferably 1 to 500 L/min and more preferably 10 to 200 L/min, per 100 L of effective volume of the firing furnace.

(Metal Oxide)

The metal oxide is preferably aluminum oxide, silicon oxide, titanium oxide, magnesium oxide, sodium oxide, potassium oxide, zirconium oxide, yttrium oxide, zinc oxide, copper oxide, iron oxide, or a spinel composite oxide of aluminum and magnesium, from the standpoint of the functionality of the metal oxide, although depending on, for example, the metal compound used. The metal oxide is more preferably aluminum oxide, silicon oxide, titanium oxide, or a spinel composite oxide of aluminum and magnesium, and even more preferably aluminum oxide or a spinel composite oxide of aluminum and magnesium.

With regard to the crystal structure and the like of the metal oxide, the metal oxide can typically have a close-packed single crystal structure because the production is performed by using the flux evaporation method. Metal oxides having such a close-packed single crystal structure can have high functionality. For example, aluminum oxide and a spinel composite oxide of aluminum and magnesium inherently have a low degree of close-packing and tend to have a polycrystalline structure and therefore are susceptible to phonon scattering, and therefore, it is difficult to achieve a high thermal conductivity. However, aluminum oxide and a spinel composite oxide of aluminum and magnesium obtained by using a flux evaporation method have a close-packed, highly regular crystal structure and therefore are not susceptible to phonon scattering and can have a high thermal conductivity. The crystal structure and the like can be appropriately controlled with, for example, the type and the amount of addition of the flux used, the type and the amount of addition of the metal compound, and the firing conditions, in the flux evaporation method.

The metal oxide may contain flux. For example, in the case that a molybdenum compound is used as the flux, a large portion of the molybdenum compound evaporates in the form of, for example, molybdenum trioxide as described above, but some portion of the molybdenum compound is incorporated into the metal oxide. As a result, aluminum oxide containing molybdenum may be colored.

The amount of flux included in the metal oxide is not particularly limited but, from the standpoint of producing the metal oxide efficiently and at low cost, is preferably not greater than 10 mass %, and more preferably not greater than 5 mass %, and even more preferably 3 to 0.01 mass %. When a metal oxide produced by using a flux method contains flux, there is a tendency for the content to be higher than those of metal elements included as incidental impurities (typically, approximately 100 ppm).

The average particle diameter of the metal oxide is not particularly limited, but is preferably 0.1 to 1000 μm, more preferably 0.2 to 100 μm, even more preferably 0.3 to 80 μm, and particularly preferably 0.4 to 60 μm. Note that, in this specification, the "average particle diameter" refers to a value determined by measuring and calculating the particle diameters of randomly selected 100 particles, from an image obtained with a scanning electron microscope (SEM). Here, the "particle diameter" refers to a maximum length of the distances between two points on the contour of the particle.

The shape of the metal oxide can be controlled by appropriately altering the production conditions in accordance with the purpose. For example, in the case that α-crystal aluminum oxide is to be produced by using molybdenum oxide as the flux and aluminum oxide as the metal compound, α-crystal aluminum oxide can be produced by appropriately altering the amount of addition of the flux and the firing conditions.

In one embodiment, by using large amounts of molybdenum oxide and causing the crystal to grow slowly over a long period of time, α-crystal aluminum oxide in hexagonal bipyramidal shape can be produced. Such α-crystal aluminum oxide can be employed in applications such as laser oscillation materials, high-hardness bearing materials, standard materials for physical properties measurement, and jewelry.

Furthermore, in another embodiment, by using small amounts of molybdenum oxide and causing the crystal to grow over a short period of time, single-crystal-structure α-crystal aluminum oxide with a narrow distribution of diameters of particles having a single crystal structure can be produced. Such α-crystal aluminum oxide can be employed in applications such as resin fillers, abrasives, and materials for fine ceramics.

In either of the cases described above, molybdenum oxide may be selectively adsorbed to [113] planes of the aluminum oxide crystal. As a result, crystal components tend not to be supplied to [001] planes, and therefore exposure of [001] planes is inhibited. As a result, α-crystal aluminum oxide in which the principal crystal plane is a plane other than the [001] plane can be produced. α-crystal aluminum oxide having such a crystal structure can be symmetrical, near-spherical, polyhedral-shaped particles as a result of effective inhibition of the growth of [001] crystal planes, as opposed to flaky α-crystal aluminum oxide obtained by ordinary firing and polyhedrons whose principal crystal plane is the [001] plane. Note that, in this specification, "in which the principal crystal plane is a plane other than the [001] plane" means that the area of the [001] planes is not greater than 20% of the total area of all crystal planes in the metal oxide.

When the metal oxide is a spinel composite oxide having a basic composition of $MgAl_2O_4$, polyhedral particles having a single crystal structure can be produced. Such spinel particles can be employed in applications such as resin fillers, catalysts, optical materials, materials for substrates, and abrasives.

When the metal oxide is a rutile-type titanium oxide, because of its excellent concealment properties and high infrared scattering ability, the metal oxide can be employed in applications such as paints, inks, and cosmetics. When the metal oxide is silicon oxide, a two-phase co-continuous structure including Q4 bonds and being practically free of silanol groups can be produced, and therefore, the metal oxide can be employed in applications such as carriers in life science, resin fillers, catalysts, and cosmetics.

(Vaporized Flux)

Although depending on the flux used, the vaporized flux is a metal oxide that typically forms flux. For example, in the case that ammonium molybdate is used as the flux, since ammonium molybdate is converted upon firing into molybdenum trioxide, which is thermodynamically stable, vaporizing flux is molybdenum trioxide. In some flux evaporation methods, in some cases, the flux and the metal compound form an intermediate product. Even in such a case, the intermediate product decomposes upon firing to undergo crystal growth, and as a result, the flux vaporizes in a thermodynamically stable form.

The temperature of the vaporized flux is preferably 200 to 2000° C. and more preferably 400 to 1500° C. although depending on the type of flux used. Typically, when the temperature of the vaporized flux is not greater than 2000° C., there is a tendency for conversion into powder to be readily carried out in the cooling pipe by blowing outside air (0 to 100° C.)

The discharge rate for the vaporized flux discharged from the firing furnace can be controlled by the amount of flux used, the temperature of the firing furnace, blowing of gas into the firing furnace, and/or the diameter of the outlet port of the firing furnace. The discharge rate for vaporized flux from the firing furnace to the cooling pipe is preferably 0.001 to 100 g/min and more preferably 0.1 to 50 g/min although depending on the cooling ability of the cooling pipe.

Furthermore, the amount of vaporized flux included in the gas discharged from the firing furnace is preferably 0.01 to 1000 mg/L and more preferably 1 to 500 mg/L.

[Step (2)]

The step (2) is a step in which vaporized flux produced in the step (1) is cooled and converted into powder.

(Cooling)

Cooling of vaporized flux is carried out by lowering the temperature of the cooling pipe. Here, examples of the cooling means include, as described above, cooling by blowing gas into the cooling pipe, cooling with a cooling mechanism of the cooling pipe, and cooling with an external cooling device.

The cooling temperature (temperature of the cooling pipe) is not particularly limited but is preferably −100 to 600° C. and more preferably −50 to 400° C.

The rate of cooling of vaporized flux is not particularly limited but is preferably 100 to 100000° C./sec and more preferably 1000 to 50000° C./sec. As the rate of cooling of flux increases, there is an increasing tendency for flux powder having a small particle diameter and a high specific surface area to be obtained.

In the case that the cooling means involves cooling by blowing gas into the cooling pipe, the temperature of the gas blown is preferably −100 to 300° C. and more preferably −50 to 100° C.

The gas blowing rate is preferably 0.1 to 20 m³/min and more preferably 1 to 10 m³/min. A gas blowing rate of not less than 0.1 m³/min makes it possible to achieve a high cooling rate and to prevent the cooling pipe from being clogged and is therefore preferable. On the other hand, a gas blowing rate of not greater than 20 m³/min eliminates the need for an expensive first blowing means (e.g., exhauster) and makes it possible to reduce the production cost and is therefore preferable.

The flow velocity within the cooling pipe upon blowing of gas is preferably 1 to 50 m/sec and more preferably 3 to 30 m/sec. A flow velocity within the cooling pipe of not less than 1 m/sec makes it possible to achieve a high cooling rate and to prevent the cooling pipe from being clogged and is therefore preferable. On the other hand, a flow velocity within the cooling pipe of not greater than 50 m/sec eliminates the need for an expensive first blowing means (e.g., exhauster) and makes it possible to reduce the production cost and is therefore preferable.

The exhaust rate and the flow velocity within the cooling pipe can be appropriately controlled with the opening degree adjustment damper.

(Conversion into Powder)

Flux that was converted into powder is transported to the recovery means and recovered.

The average particle diameter of the primary particles of flux that is converted into powder is preferably 0.001 to 1000 μm and more preferably 0.005 to 10 μm. An average particle diameter of the primary particles of not less than 0.001 μm enables efficient recovery in the recovery means and is therefore preferable. On the other hand, an average particle diameter of not greater than 1000 μm makes it possible to prevent or inhibit clogging due to accumulation in pipes, such as the cooling pipe, and/or enables transport from the cooling pipe to the recovery means and is therefore preferable.

[Step (3)]

The step (3) is a step in which powdered flux, which is produced in the step (2), is recovered.

(Recovery)

Powdered flux is recovered by the recovery means.

The method for recovery is not particularly limited and may be a batch method or a continuous method.

In the case of a batch method, powdered flux is recovered from the recovery means for every reaction. In such a case, when the recovered flux is used for production of a metal oxide, the amount of addition, the particle diameter, and the like may be adjusted in advance to suitably carry out, for example, control of the shape of the metal oxide.

In the case of a continuous method, powdered flux is recovered successively during the duration of the reaction. In such a case, the flux can be directly and continuously mixed with a metal compound and loaded into the firing furnace, which can produce an effect of, for example, an increase in the amount of a metal oxide produced in a unit time.

[Step (4)]

The step (4) is a step in which the recovered flux is reused.

(Reuse)

The flux recovered in the step (3) is one obtained by converting vaporized flux into powder and tends to be highly pure. Accordingly, this can be reused for production of a metal oxide again. As a result, environmental impact can be reduced, and the production cost can be reduced.

EXAMPLE

The present invention will now be described in more detail with reference to examples; however, the present invention is not limited to these examples.

Example 1

Production of a metal oxide was carried out using an RHK simulator (manufactured by NORITAKE CO., LIMITED) as the firing furnace and a VF-5N dust collector (manufactured by AMANO Corporation) as the dust collector.

4 kg of a transition aluminum oxide (manufactured by Wako Pure Chemical Industries, Ltd., activated alumina, average particle diameter of 45 μm) was mixed with 1 kg of molybdenum trioxide (manufactured by Taiyo Koko Co., Ltd.). The resulting mixture was loaded into a saggar and fired in the production apparatus 1 illustrated in FIG. 1. During the firing step, the dust collector 4 was operated while outside air (blowing rate: 50 L/min, temperature of outside air: 25° C.) was introduced through side faces and the lower face of the firing furnace 2. The exhaust rate of the exhauster 8 and the opening degree adjustment damper 6 were adjusted, and then outside air was blown through the opening degree adjustment damper 6 (blowing rate: 2 m$^3$/min, flow velocity within the pipe: 6 m/sec, temperature of outside air: 25° C.), and the degree of pressure reduction in the firing furnace 2 was maintained at −400 Pa.

The firing temperature was maintained at 1300° C. for 10 hours. When the firing temperature reaches 700° C. or higher, a reaction between a transition aluminum oxide and molybdenum trioxide begins, and aluminum molybdate is formed. By the time the firing temperature reaches 1300° C., aluminum molybdate decomposes, and vaporized molybdenum trioxide evaporates (an XRD measurement was performed using a method described below on a sample obtained by firing at a temperature of 800° C., and a scattering peak derived from a transition aluminum oxide and a scattering peak derived from aluminum molybdate were observed). The molybdenum trioxide is discharged through the outlet port 5 of the firing furnace 2 to the cooling pipe 3. In the cooling pipe 3, the vaporized molybdenum trioxide is mixed with blown outside air and is thereby cooled and converted into powder. Here, the cooling rate is 2000 to 2500° C./sec, and, by rapid cooling to 200° C. or lower, conversion into powder is accomplished. The powdered molybdenum trioxide was transported by using the exhauster 8 and outside air blown through the opening degree adjustment damper 6 and was recovered with a filter within the dust collector 4.

After firing, 3.89 kg of aluminum oxide (metal oxide), which was blue powder, was taken out of the saggar.

Figure 4:
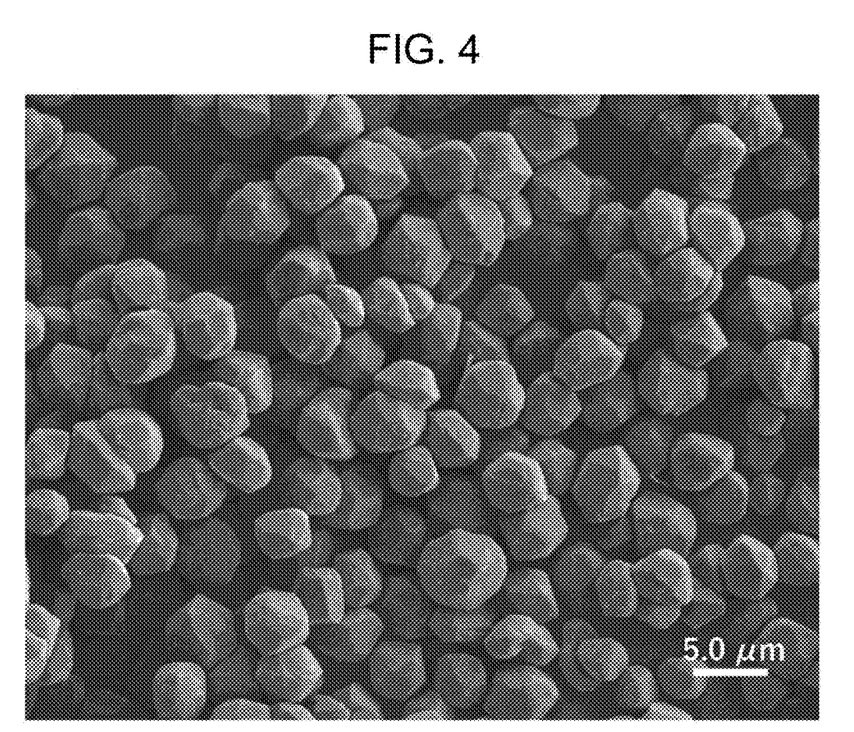
FIG. 4 is a scanning electron microscope (SEM) image of a metal oxide produced in Example 1.

The aluminum oxide (metal oxide) was examined with a scanning electron microscope (SEM). Specifically, the powder was fixed to a sample holder with double-sided tape and examined with a surface examination apparatus VE-9800 (manufactured by KEYENCE CORPORATION). FIG. 4 shows a scanning electron microscope (SEM) image of the metal oxide produced in Example 1. As a result, the average particle diameter was found to be 5 μm. In addition, it was observed that the particles were polyhedral particles in which the principal crystal plane was a crystal plane other than the plane.

Figure 5:
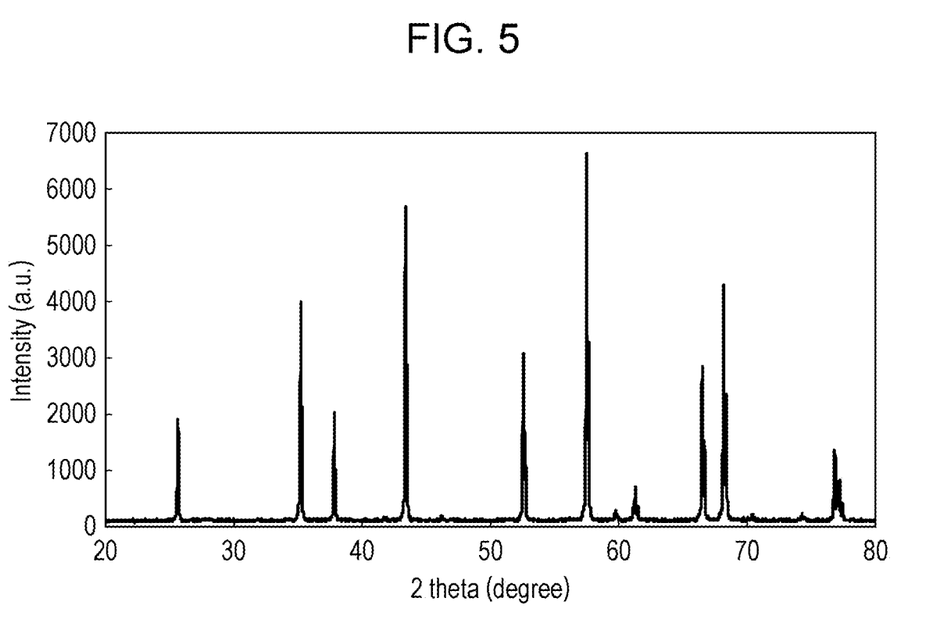
FIG. 5 is a chart of an X-ray diffraction analysis (XRD) of the metal oxide produced in Example 1.

In addition, the aluminum oxide (metal oxide) was examined by X-ray diffraction analysis (XRD). Specifically, the aluminum oxide (metal oxide) powder was loaded into a measurement sample holder, which was placed in a wide-angle X-ray diffractometer Rint-Ultima (manufactured by Rigaku Corporation). A measurement was then performed under the following conditions: Cu/Kα radiation, 40 kV/30 mA; scanning speed, 1.0 degree/min; and scanning range, 5 to 80 degrees. FIG. 5 shows a chart of an X-ray diffraction analysis (XRD) of the metal oxide produced in Example 1.

As a result, a sharp scattering peak derived from α-aluminum oxide appeared, and no peaks associated with crystals other than the α-crystal structure were observed.

Furthermore, the molybdenum content of the aluminum oxide was measured by an X-ray fluorescence quantitative evaluation measurement. Specifically, 100 mg of the aluminum oxide (metal oxide) powder was placed on filter paper, which was then covered with a polypropylene (PP) film, and the measurement was performed using a ZSX100e (manufactured by Rigaku Corporation), which measures X-ray fluorescence. As a result, the molybdenum content of the aluminum oxide was 0.60 mass %.

Furthermore, the molybdenum oxide recovered in the dust collector was taken out.

The rate of recovery of molybdenum oxide was 80% (0.8 kg) relative to the loading amount.

Furthermore, an X-ray fluorescence quantitative evaluation measurement was performed in a manner similar to that described above to measure the purity of the molybdenum trioxide, and the purity was found to be 99.5%.

The production apparatus was observed, and it was found that there was substantially no narrowing, blockage, or the like of the firing furnace outlet ports and the cooling pipe.

Example 2

Production of a metal oxide (aluminum oxide) was carried out in a manner similar to that in Example 1 except that the molybdenum trioxide recovered in Example 1 was used.

The obtained results were similar to that of Example 1.

Comparative Example 1

Production of a metal oxide (aluminum oxide) was carried out in a manner similar to that in Example 1 except that the dust collector 4 and the exhaust device 8 were not used.

In the case that the dust collector 4 and the exhaust device 8 are not used, passive blowing through the opening degree adjustment damper 6 into the cooling pipe 3 is not carried out, and therefore, vaporized flux (molybdenum trioxide) included in the gas discharged from the firing furnace 2 cannot be cooled or converted into powder.

As a result, during firing, molybdenum trioxide was deposited in the outlet port 5 of the firing furnace, and blockage occurred. As a result, most of the flux remained within the firing furnace.

REFERENCE SIGNS LIST

1 Metal oxide production apparatus
2 Firing furnace
3 Cooling pipe
4 Dust collector
5 Outlet port
6 Opening degree adjustment damper
7 Observation window
8 Exhaust device
9 External cooling device

The invention claimed is:

1. A metal oxide production apparatus that implements a flux evaporation method, the production apparatus comprising:
 a firing furnace configured to subject a metal compound to firing in a saggar in the presence of flux;
 a cooling pipe connected to the firing furnace and configured to convert vaporized flux resulting from the firing into powder;

a recovery means configured to recover powdered flux converted in the cooling pipe; and a suction device, the suction device being a first blowing means configured to blow gas into the cooling pipe, the suction device being configured to perform suctioning to cause gas to be blown in the cooling pipe.

2. The production apparatus according to claim 1, wherein the recovery means comprises a dust collector.

3. The production apparatus according to claim 1, wherein the cooling pipe includes an outside air supply port.

4. The production apparatus according to claim 1, wherein the suction device is connected to the recovery means.

5. The production apparatus according to claim 1, wherein the firing furnace comprises at least one second blowing means.

6. The production apparatus according to claim 2, wherein the cooling pipe includes an outside air supply port.

7. The production apparatus according to claim 2, wherein the firing furnace comprises at least one second blowing means.

8. The production apparatus according to claim 3, wherein the firing furnace comprises at least one second blowing means.

9. The production apparatus according to claim 4, wherein the firing furnace comprises at least one second blowing means.

10. The production apparatus according to claim 6, wherein the firing furnace comprises at least one second blowing means.

\* \* \* \* \*